United States Patent
Bourgine De Meder

(10) Patent No.: US 7,567,166 B2
(45) Date of Patent: Jul. 28, 2009

(54) SAFETY/SECURITY METHOD AND DEVICE FOR TWO-WHEELED VEHICLES AND SIMILAR

(76) Inventor: Laurent Bourgine De Meder, Résidence d'Hennebont, Bat 5C-78100 Saint Germain En Laye (FR)

( * ) Notice: Subject to any disclaimer, the term of this patent is extended or adjusted under 35 U.S.C. 154(b) by 847 days.

(21) Appl. No.: 10/521,550

(22) PCT Filed: Jul. 10, 2003

(86) PCT No.: PCT/FR03/02160

§ 371 (c)(1),
(2), (4) Date: Sep. 23, 2005

(87) PCT Pub. No.: WO2004/009415

PCT Pub. Date: Jan. 29, 2004

(65) Prior Publication Data

US 2006/0164217 A1    Jul. 27, 2006

(30) Foreign Application Priority Data

Jul. 18, 2002    (FR) .................................. 02 09170

(51) Int. Cl.
| B60Q 1/00 | (2006.01) |
| B60R 25/10 | (2006.01) |
| B62H 5/00 | (2006.01) |
| B62J 3/00 | (2006.01) |
| G08B 1/08 | (2006.01) |
| G08G 1/123 | (2006.01) |

(52) U.S. Cl. ................. 340/432; 340/425.5; 340/426.1; 340/426.19; 340/426.2; 340/427; 340/435; 340/436; 340/440; 340/539.1; 340/988

(58) Field of Classification Search ............. 340/425.5, 340/426.1, 426.19, 426.2, 435, 436, 427, 340/432, 440, 988, 539.1, 539.13
See application file for complete search history.

(56) References Cited

U.S. PATENT DOCUMENTS

| 4,383,242 A | 5/1983 | Sassover et al. |
| 5,223,844 A | 6/1993 | Mansell et al. |
| 5,929,753 A * | 7/1999 | Montague ............... 340/426.19 |
| 6,034,594 A * | 3/2000 | Gray ........................... 340/440 |

(Continued)

FOREIGN PATENT DOCUMENTS

FR    2 771 982 A1    6/1999

(Continued)

*Primary Examiner*—Benjamin C Lee
*Assistant Examiner*—Lam P Pham
(74) *Attorney, Agent, or Firm*—Browdy and Neimark P.L.L.C.

(57) ABSTRACT

The invention relates to a safety/security method and device for two-wheeled vehicles and similar. The inventive device comprises a processor which is connected to a geographic positioning centre (CL) and to a communication unit (UT) with a cellular telephone system which can communicate with a party. The aforementioned processor is also connected to a start/stop sensor (M/A), a movement sensor (AC) and an inclinometer (CV) and to means of identifying the vehicle and/or the driver. The processor is programmed so as to: centralise and store the data originating from the above-mentioned sensors; select a device state from numerous pre-determined states including one or more sensitive states; and, when a sensitive state has been selected, compose and transmit a message containing data relating to said state, vehicle and/or driver identification data and geographic positioning data.

16 Claims, 3 Drawing Sheets

U.S. PATENT DOCUMENTS

| | | | | |
|---|---|---|---|---|
| 6,040,763 | A * | 3/2000 | Nakajima | 340/427 |
| 6,236,307 | B1 * | 5/2001 | Kurano | 340/426.28 |
| 6,268,794 | B1 * | 7/2001 | Tzanev | 340/475 |
| 6,297,731 | B1 | 10/2001 | Flick | |
| 6,379,133 | B1 * | 4/2002 | Hahn et al. | 418/55.1 |
| 6,515,580 | B1 * | 2/2003 | Isoda et al. | 340/425.5 |
| 6,587,040 | B2 * | 7/2003 | Seto | 340/426.1 |
| 6,587,042 | B2 * | 7/2003 | Tabata et al. | 340/432 |
| 6,608,553 | B2 * | 8/2003 | Isobe | 340/426.1 |
| 6,678,612 | B1 * | 1/2004 | Khawam | 701/213 |
| 6,791,456 | B2 * | 9/2004 | Nakayama et al. | 340/429 |
| 6,801,124 | B2 * | 10/2004 | Naitou | 340/426.19 |
| 7,034,665 | B2 * | 4/2006 | Kojika et al. | 340/427 |
| 7,124,852 | B2 * | 10/2006 | Hasegawa | 180/282 |
| 7,187,284 | B2 * | 3/2007 | Masciantonio | 340/568.2 |
| 2001/0029415 | A1 | 10/2001 | Flick | |

FOREIGN PATENT DOCUMENTS

| | | |
|---|---|---|
| WO | WO 00/58136 A1 | 10/2000 |
| WO | WO 01/20575 A1 | 3/2001 |

* cited by examiner

SAFETY/SECURITY METHOD AND DEVICE FOR TWO-WHEELED VEHICLES AND SIMILAR

BACKGROUND OF THE INVENTION

1. Field of the invention
2. Description of the Prior Art

The present invention relates to a method and a security device specifically designed for two-wheeled vehicles and the like such as for example, motor cycles, snowmobiles, water scooters, quads, tricycles, etc. . . . .

Generally, it is known that many solutions have already been proposed for providing security of the vehicles, in particular against theft.

So, automobile vehicles are frequently equipped with a security device for triggering an alarm and/or switching off the general electric power supply subsequently to the detection of one or more parameters revealing the breaking into and/or the theft of the car.

Usually, these safety devices only operate when the vehicle is stationary. They involve complex detection systems specific to these vehicles (detection of the presence of persons on board the vehicle) which are not usable on two-wheeled vehicles or the like.

Moreover, systems have also been proposed, which use the cellular telephone network for remotely transmitting from a standard telephone set, to a telephone receiver housed in the vehicle, a message causing the car to stop with optional emission of sound and/or light alarm signals. With this solution, information for approximately localizing the vehicle may further be obtained by the cellular network.

Additionally, there are systems which may be taken on board of a vehicle, with which the position of the vehicle may be determined, for example through a GPS (Global Positioning System) system and this information may be remotely transmitted to the owner or a surveillance center, via the GSM network for example. The owner or the surveillance center may then check that the vehicle is actually in an authorized area. In the opposite case, an alarm is triggered and means are applied for taking back possession of the vehicle by the information provided by the GPS.

It is found that these devices are not well suited for two-wheeled vehicles or the like, which do not comprise a compartment, and the different units of which may easily be accessed and neutralized by experienced thieves.

This is the reason why alarm systems have therefore been proposed, specifically designed for the vehicles which generally comprise accelerometers and/or tilt detectors associated with a circuit which triggers an alarm when a non-authorized person displaces the vehicle from the position where it has been parked by the owner.

These systems are found to be insufficiently effective and they do not dissuade the thieves which for said reasons, either manage to neutralize them or to carry out the theft of the vehicle when the vehicle is running or when no anti-theft system is active (car hijack). A frequent method for stealing two-wheeled vehicles consists of taking away the two-wheeled vehicle in a transport vehicle by disregarding the alarm signal which was triggered or by neutralizing it.

In addition, with these security devices, accidents which are likely to occur, cannot be detected, and emergency services (or a surveillance center) cannot be informed in the case when the accident has serious consequences for the driver and/or his/her passenger and/or causes material damages.

OBJECT OF THE INVENTION

More specifically, the object of the invention is therefore to eliminate these drawbacks.

SUMMARY OF THE INVENTION

For this purpose, it proposes a method comprising the following steps:

detecting a plurality of parameters respectively relating to the identification of the vehicle and/or its owner, the operation of the vehicle (running/stopped), the position of the vehicle (upright/tilted), the displacements of the vehicle (parked/moving), the geographical localization, the presence of the driver on the vehicle, determining the state of the system according to the nature of the detected parameters, by means of a correspondence table and/or pre-programmed logic, when passing to at least one of the states of the system, elaborating a message comprising data for identifying the vehicle, its position as well as data corresponding to the state of the system, establishing a telephone connection with a remotely located callee for example a surveillance center and transmitting the message to said callee.

Of course, if, during said passage, the system did not manage to establish the communication, the system will make a succession of connection attempts until the connection is established and until transmission of the message is completed.

This feature is intended to take into account the case when, at the moment of said passage, the vehicle is isolated from the outside world, e.g. inside a transport vehicle, a building, an underground parking lot, or any area and/or position outside the coverage area.

Of course, the device for applying the method according to the invention will be preferably, but not necessarily, housed in a case designed so that it is easily installed and concealed in the internal portion of the vehicle. The system of antennas which is used for establishing telephone connections or for geographical localization should remain invisible and directed skywards without being covered by a metal wall. This case should preferably contain the entire detection means in order to avoid wirings.

Considering the fact that it necessarily contains a tilt detector, this case should be fixed in a well-defined position (except if this tilt detector may be orientated). Alternatively, this tilt detector may be outsourced in order to/or facilitate the adjustment.

The system which must operate permanently, even in the case of an extended halt, should therefore comprise means for optimizing its power consumption (control of the power supply of the circuits in order to only energize at a given instant the circuits which are actually used—standby mode), it being understood that the service life of the device should be several months.

Also, the system should be designed so as to be able to withstand a certain level of aggression. In particular, the case should be designed to withstand opening (for example, the use of specific tools to open it), mechanical shocks such as hammer blows.

The electrical connections should be designed if possible with positive security (power cut or short-circuit detection).

BRIEF DESCRIPTION OF THE DRAWINGS

An embodiment of the invention will be described hereafter, as a non-limiting example, with reference to the appended drawings wherein.

DESCRIPTION OF THE PREFERRED EMBODIMENTS

Figure 1:
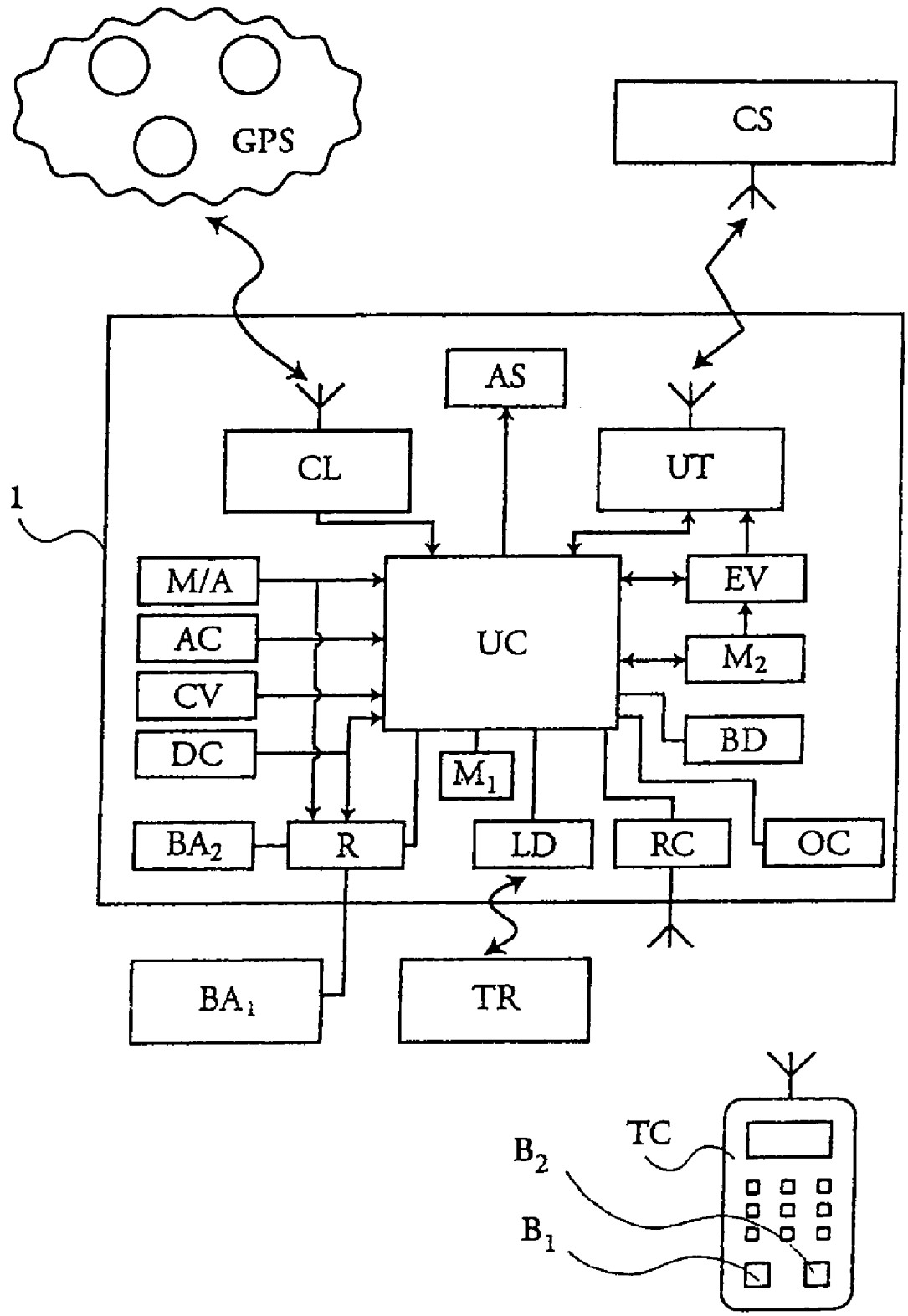
FIG. 1 is a block diagram of a safety device according to the invention.

In the example illustrated in FIG. 1, the safety device is intended to fit out a two-wheeled vehicle such as a motorcycle.

It comprises inside a case 1, a central processing unit UC (for example a microcontroller, microprocessor, . . . ) coupled with a geographical central localization facility CL of the GPS type for example, and with a communications unit UT with a GSM cellular telephone network which may communicate with a caller such as a surveillance center CS.

This central unit UC is further connected to a plurality of detectors, i.e.: a detector of the running/stopped state M/A of the motorcycle's engine, a detector, for example an accelerometer AC, enabling the motorcycle's displacements to be detected, a central facility CV for analyzing verticality (orientation), as well as a detector DC of the charge and charge variations of the motorcycle's battery $BA_1$ and optionally of a battery $BA_2$ (or accumulator) specific to the device.

It is further connected to a memory $M_1$ containing the motorcycle's identification data and to a device LD for remotely reading a transponder TR worn by the driver of the motorcycle and in which an identifier of this driver is stored.

The device may further comprise a RC receiver, tuned on a transmitter mounted in a remote control case TC intended to equip the owner of the vehicle, this remote control case comprising control means for disabling the surveillance function, and control means for triggering an immediate "emergency call" alarm regardless of the state of the vehicle or of the device.

This central processing unit UC is programmed so as to define several predetermined states of the system, depending on the state of detectors M/A-AC-DC-CV; it centralizes data from detectors M/A-AC-DC/CV, stores them, processes them, and accordingly decides by means of a processing logic, on the state of the system and of its behavior. This central unit UC may provide the role of a management and analysis center which provides information exchanges within the system. The entire exchanged information may be described and specified in a messaging dictionary (database BD).

The central unit UC may further be connected to a voice synthesis circuit comprising a memory unit $M_2$ containing digital data corresponding to phonemes and a voice encoder EV used for generating audio messages transmissible by the communications unit UT. This solution has the advantage of allowing a person having a standard telephone set to directly receive comprehensible audio messages without having to use a decoder.

Also, the central unit UC may control a sound warning system AS, of the buzzer type for example.

By these measures, the safety device may provide the following specific functions:

- detection of normal running of the motorcycle (analysis of the battery voltage and/or the current intensity/vibrations/electromagnetic wave emission),
- detection of suspicious behaviors (movement, tilt, lifting of the motorcycle, . . . ),
- geographical localization of the position by the central localization facility CL,
- transmission of the alarm and of the position to the surveillance center CS,
- reconstructing the route from inertial data provided by the accelerometric detector and/or from localization data provided by the central localization facility,
- identification of the motorcycle and of its owner by the surveillance center CS,
- emergency call to the surveillance center CS.

Optionally, the device may carry out control actions from control signals transmitted by the surveillance center CS. For this purpose, the central unit UC may be connected to control units (cutting the ignition (switching on/off the safety device), closing a solenoid valve controlling the fuel supply of the motorcycle, activation of a siren, . . . ) via a control interface OC.

More specifically, the device may combine information delivered by detectors M/A-AC-CV-CL in order to further provide the following functions:

- in-operation detection of extended loss of verticality which is a potential sign of accident,
- start-up or shut-down of the system by the surveillance center CS, depending on information contained in the messages transmitted by the communications unit UT, in order to facilitate technical interventions for example,
- storage at regular intervals of the position of the motorcycle in order to transmit these data to the surveillance center,
- remote control of various outputs (horn, blinker, power supply, . . . ),
- management of the level of the battery $BA_1$ in order to send an alert message when this level becomes low (for example, a maintenance action).

The detection of suspicious behaviors is based on several types of detection (displacement/tilt, power cut), associated with localization by the central localization facility CL and with concordance analysis.

The detection of the displacements may be provided by means of a detector AC, for example comprising a switch with vibration sensitive contacts regardless of the position in which it is found. It generates pulses (state transition) at a variable frequency which depends on the level and the frequency of the vibrations or movements. This switch is conditioned (associated with a conditioning circuit) in order to generate a low frequency (of the order of 0.2 to 1 Hz for example) signal. This signal allows the central unit UC to be woken up by a wake-up circuit R controlling the power supply of the central unit UC in order to trigger a pre-alarm.

In fact, the detector/conditioner AC set is the only module which is operational regardless of the state of the system and of the state of the motorcycle. It may be designed in order to maximally reduce its power consumption.

The tilt detector CV consists of an omnidirectional switch which changes its output state as soon as the tilt angle relatively to the horizontal exceeds a certain threshold (15, 30, 45 or 60°). It is conditioned and filtered for generating a low frequency signal in order to avoid parasitic signals essentially due to vibrations. Detection of an omnidirectional tilt may express the lifting of a wheel of the motorcycle or sides tilt.

Advantageously, detectors M/A, AC, CV, DC, may provide TOR (on-off type signal, binary 0 or 1, 0 V or 5 V, opened or closed contact) type signals. The state or the state transition of these signals indicates that the motorcycle has moved, has been shaken, lifted, or tilted by a large angle in any direction.

Concordance analysis may be used for determining and tracking in time one or more suspicious events. This may be the tracking:
  of only one parameter such as:
    movements or vibrations detected in the pre-alarm mode during a predetermined time TVP3,
    a tilt detected in the pre-alarm mode during a time "Tip",
    a displacement of the motorcycle detected by the central localization facility in the pre-alarm mode over a predetermined distance;
  a combination of parameters such as an external power cut, associated with brief detection of motion,
  a succession of parameters such as loss of verticality, with the engine running, associated with the detection of a sudden drop in speed by the central localization facility, this combination of successive parameters meaning the presence of an accident.

As mentioned earlier, the motorcycle, or more specifically its engine, may again be found in one of the two following states:
  ETAT_MOT=MOT_MARCHE: the engine of the motorcycle is running,
  ETAT-MOT=MOT_ARRET: the engine of the motorcycle is stopped, Detection of ETAT_MOT will be achieved by measuring the voltage of the battery and comparing it with a charging threshold (for example, of the order of 13 V).

Figure 2:
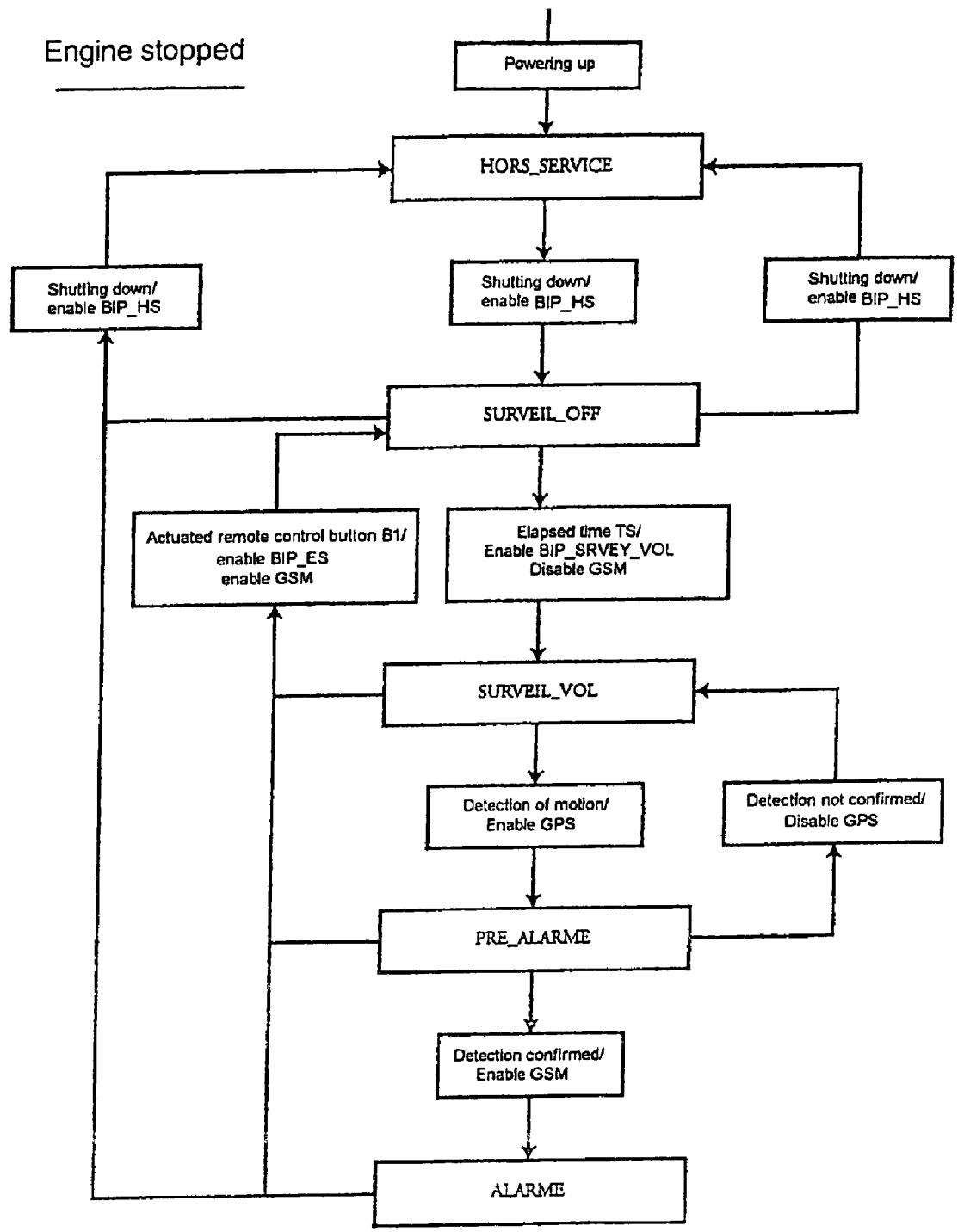
FIG. 2 is a flow chart illustrating the behavior of the system when the engine of the motorcycle is stopped.
Figure 3:
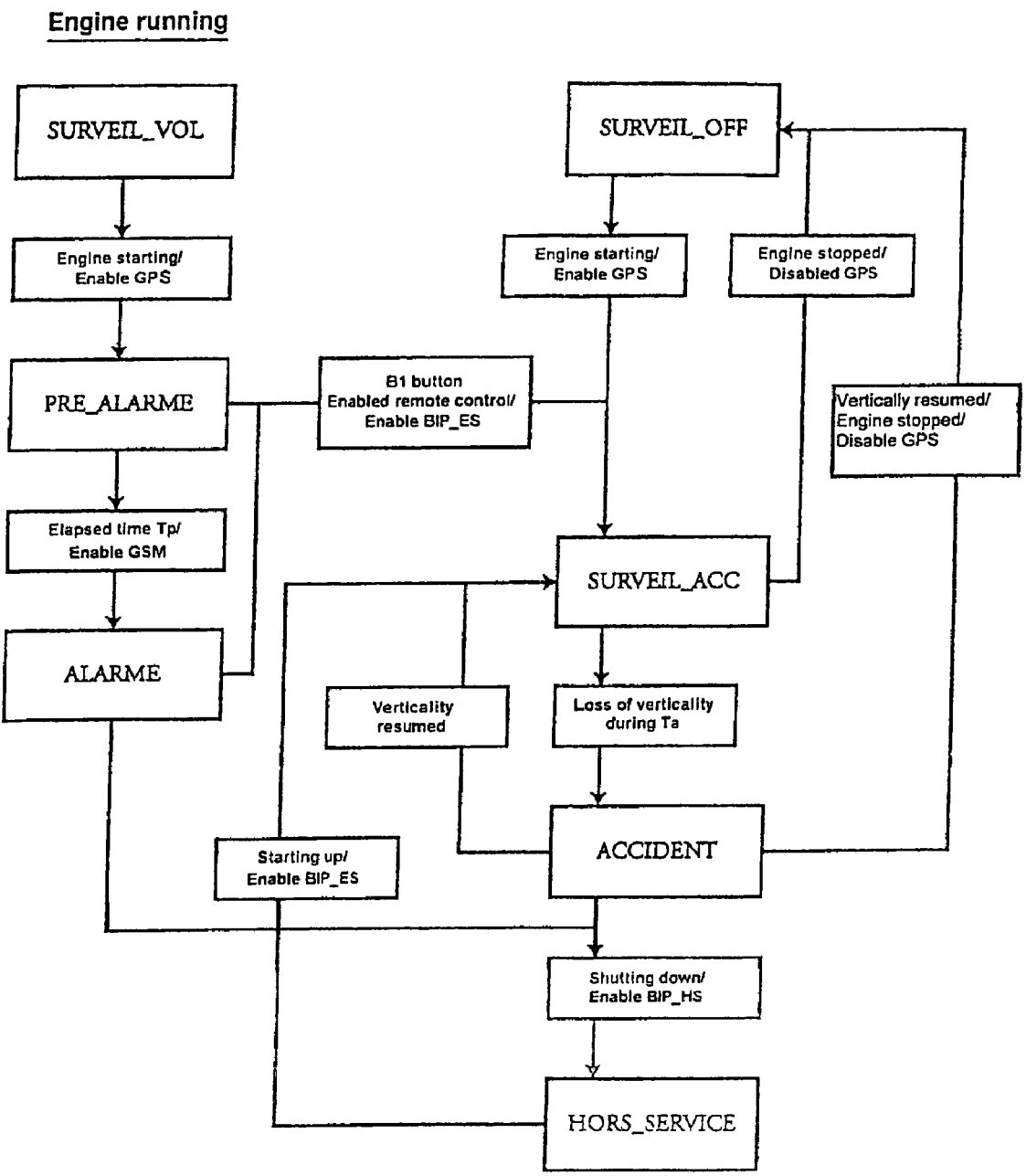
FIG. 3 is a flow chart illustrating the behavior of the system when the engine of the motorcycle is running.

The system may itself be found in one of the following states which are again found in the flow charts of FIGS. 2 and 3:
  ETAT_SYS=HORS_SERVICE: system is disabled or shut down,
  ETAT_SYS=SURVEIL_OFF: motorcycle surveillance is disabled,
  ETAT_SYS=SURVEIL_VOL: theft surveillance of the motorcycle is enabled,
  ETAT_SYS=PREALARME: the system has detected a suspicious event,
  ETAT_SYS=ALARME: triggering of a theft alarm,
  ETAT_SYS=SURVEIL_ACC: accident surveillance is enabled,
  ETAT_SYS=ACCIDENT: triggering of an accident alarm.

Advantageously, the device may further comprise an RC receiver tuned on a transmitter mounted in a remote control case TC intended to equip the owner of the motorcycle, this remote control case comprising two buttons $B_1$, $B_2$, i.e.:
  a button $B_1$ providing functions for:
    disabling theft surveillance (passage from the SURVEIL_VOL to SURVEIL_OFF state),
    immediately acknowledging the alarms and pre-alarms (cutting the communication in the case of transmission of the alarm),
    routinely emitting a distinctive sound signal (beep) which confirms receipt of the remote control signal while indicating the state of the signal (for example, three successive beeps when the system is in service and a long beep when it is shut down),
  an (optional) button $B_2$ for triggering an immediate "emergency call" alarm regardless of the state of the motorcycle or of the system.

According to the state of the motorcycle and of the system, enabling button $B_1$ of the remote control TC produces the following effects:

| ETAT_MOT | ETAT_SYS | Next ETAT_SYS |
| --- | --- | --- |
| MOT_ARRET | SURVEIL_VOL | SURVEIL_OFF |
| MOT_ARRET | PRE_ALARME | SURVEIL_OFF |
| MOT_ARRET | ALARME | SURVEIL_OFF |
| MOT_MARCHE | PRE_ALARME | SURVEIL_ACC |
| MOT_MARCHE | ALARME | SURVEIL_ACC |
| MOT_MARCHE | ACCIDENT | SURVEIL_ACC |

Also, the GPS and GSM modules will be enabled (ON) or disabled (OFF) depending on the state of the system and the state of the motorcycle according to the following table which provides the states of the GPS and GSM modules (ETAT_GS, ETAT_GP) depending on the state of the system ETAT_SYS and the state of the engine ETAT_MOT:

| ETAT_SYS | ETAT_MOT | ETAT_GSM | ETAT_GPS |
| --- | --- | --- | --- |
| HORS_SERVICE | MOT_MARCHE | ON | ON |
|  | MOT_ARRET | ON/OFF* | OFF |
| SURVEIL_VOL | MOT_ARRET | OFF | OFF |
| SURVEIL_ACC | MOT_MARCHE | ON | ON |
| SURVEIL_OFF | MOT_MARCHE | ON | OFF |
| PRE_ALARME | MOT_MARCHE | ON | ON |
|  | MOT_ARRET | OFF | ON |
| ALARME | MOT_MARCHE | ON | ON |
|  | MOT_ARRET | ON | ON |
| ACCIDENT | MOT_MARCHE | ON | ON |

*The GSM module is set to ON after each actuation of button $B_1$ of the remote control or subsequently to a stop of the engine, for a time Ts of the order of three minutes. It then changes to OFF automatically.

It is understood that the SURVEIL_ACC and ACCIDENT states only occur if the engine is running and conversely, the SURVEIL_OFF and SURVEIL_VOL states only occur when the engine is stopped.

When the system is shut down, the detection functions are inhibited, no alarm is detected or sent back. Only the surveillance center may enable or disable the system. For this, the following procedure should be followed as illustrated in FIG. 2:
  in order to shut down (disable) the system, (transition to the HORS-SERVICE state) the operator should carry out the following operations:
    have the owner of the motorcycle call the surveillance center in order to request the shutting down of the system,
    have the owner identified by the surveillance center which asks the owner to transmit to it his/her identifier and/or his/her password,
    press button $B_1$ of the remote control to change to the SURVEIL_OFF state or start the motorcycle in order to enable the GSM communications unit,
    when disabling is completed, have the system emit a sound signal (beep), a sign of shutting down,
    optionally check at any moment the state of the system by pressing on button $B_1$ of the remote control: a distinctive beep then shows that the system is shut down.
  also, to obtain the starting up of the system, the operator should perform the following operation sequence illustrated in FIG. 3:

have the owner of the motorcycle call the surveillance center to request the starting up of the system, have the owner of the motorcycle identified by the surveillance center which asks the owner for his/her identifier and his/her password, press on button $B_1$ of the remote control in order to change to the SURVEIL_OFF state or start the motorcycle in order to enable the GSM unit, when enabling is completed, a sound signal (Beep) is emitted by the system, a sign of its starting up, at any instant, check the state of the system by pressing button $B_1$ of the remote control, a distinctive beep indicating that the system is shut down.

To remind the user that the system is shut down, a regular beep may be emitted while the engine is running.

The SURVEIL_OFF state is a transient state which lasts for one theft surveillance TS period at the most, when the motorcycle is stationary (of the order of 3 minutes). After this time, the system passes into the SURVEIL_VOL state except when button $B_1$ of the remote control is actuated which resets the TS period.

The system is put in this state subsequently to the following events:

actuation of button $B_1$ of the remote control while the engine is stopped and ETAT_SYS=SURVEIL_VOL, stopping of the engine while
ETAT_SYS=SURVEIL_ACC or ACCIDENT.

In this state, no surveillance is provided, GPS is disabled. As for the GSM unit, it is enabled in order to allow the central surveillance facility to contact it (for shutting down the system for example).

Possible exits from this state are the following:

starting the motorcycle: allows the system to pass into the SURVEIL_ACC state which is the normal state of the system when the engine is running, exceeding the TS period: allows theft surveillance to be enabled and returned to the SURVEIL_VOL state, shutting down the system subsequently to an intervention of the surveillance center.

The SURVEIL_VOL state is the state which naturally succeeds to the SURVEIL_OFF state after period TS. The driver is warned that the system is in this state by a sound signal (BIP-BIP) (beep-beep).

In this state, the motorcycle is under surveillance and the detection device is enabled. Any movement, vibration, choc or power cut, causes the passing into the PRE_ALARME state.

In the SURVEIL_VOL state and if the motorcycle is stationary, the GPS central facility and GSM unit are disabled, which means that it is impossible to contact the system from the surveillance center.

The central GPS facility does not need to be enabled theoretically; a motorcycle in the SURVEIL_VOL mode cannot be moved from its place. The GSM unit is disabled for the sake of saving energy.

Possible exits from this state are the following:

actuation of button $B_1$ of the remote control: allows the system to pass into the SURVEIL_OFF state, starting the motorcycle: allows the system to pass into the PRE_ALARME state.

When a suspicious event is detected in the SURVEIL_VOL mode, the system immediately passes into the PRE_ALARM mode.

This may be a movement, vibration, starting of the engine or voltage failure. From then on, GPS is enabled and periodical measurements are stored in memory.

In the event of a voltage failure of the battery, the system monitors the voltage and passes into the ALARME mode after a period of time Tp if the voltage is still absent.

When the engine is stopped (ETAT_MOT=MOT_ARRET), the system analyzes the movements, vibrations and tilts of the motorcycle. If repetitive events are detected during time Tp, the system passes into the ALARME state, otherwise it considers that this is a false alarm and it resumes the SURVEIL_VOL mode.

If button $B_1$ of the remote control is actuated, the system passes into the SURVEIL_OFF state for a time Ts before resuming the SURVEIL_VOL state.

If, when the engine is running (ETAT_MOT=MOT_MARCHE), after the same time Tp, button $B_1$ of the remote control is not actuated, the system passes into the ALARME state. This is even valid if in the meantime the engine has stopped.

In this case, the system emits a continuous beep during the whole PREALARM period in order to inform the driver that the alarm needs to be inhibited by pressing on the $B_1$ button of the remote control.

When the system passes into the ALARME state, it enables the GSM and attempts to establish a communication in order to trigger the alarm and send its position.

If the communication is established, the alarm message is repeatedly sent until an acknowledgement is received from the surveillance center.

The system begins to listen and executes the transmitted orders. It therefore remains enabled and connected. Cutting-off communications will be performed on the initiative of the surveillance center.

If the communication is not established (receiving problem, busy line, . . . ), the system make repetitive attempts.

The two ways for exiting the ALARME state are:

actuation of the $B_1$ button of the remote control, have the system shut down by the surveillance center, which returns the system to the HORS_SERVICE sate.

The system passes into the SURVEIL_ACC state in either of the two following cases:

when the engine starts while the system is in the SURVEIL_OFF state, when button $B_1$ of the remote control is actuated while the engine is running (ETAT_SYS=PRE_ALARME, ALARME or ACCIDENT).

In this state, the system considers there are no risks of theft.

In the SURVEIL_ACC state, the system maintains tilt surveillance and acquisition of its position in order to detect a possible extended loss of verticality which will be assimilated to an accident. In this case, it passes into the ACCIDENT state.

The central GPS localization facility and the GSM communications unit are both active in this state. The system is ready to receive communications from the center and to execute its orders.

If the engine is stopped, the system immediately passes into the SURVEIL_OFF state. It will remain in this state for a certain time Ts before resuming the SURVEIL_VOL state.

When the system passes into the ACCIDENT state, it attempts to establish a communication with the detector as if this was an alarm.

If successful, it informs the center on the accident and on its own position and checks that it has properly received the acknowledgment AQ before cutting off the communication.

Both the GPS and GSM remain enabled. The system remains ready to receive communications from the center and to execute its orders.

If the motorcycle is set upright, and the engine is still running, the system resumes the SURVEIL_ACC mode.

If the state-transition is not upright, and the engine is stopped, the system passes into the SURVEIL_OFF state.

The state-transition diagrams illustrated in FIGS. 2 and 3, describe the different states in which the system may be found as well as the conditions for passing from one state to another and the actions to be executed during these transitions. The symbol "/" separates the conditions of the actions at each transition.

The first diagram (FIG. 2) illustrates the behavior of the system when the engine is stopped.

According to this diagram, in order to use the motorcycle, the user should press button $B_1$ of the remote control in order to inhibit the alarm system, this action generates:

- either a sound signal BIP-BIP-BIP (beep-beep-beep) meaning that the alarm is inhibited and that the user has three minutes (Ts) for starting the engine. At fault, after three minutes, a BIP-BIP (beep-beep) signal reports that the alarm has been re-enabled,
- or an extended sound signal, informing that the alarm system has been shut down. The surveillance center should then be called in order to enable it (see enabling procedure),
- if no sound signal is emitted, several attempts should be made. There may be a receiving problem of the remote control. If nothing happens, the user should check the battery of the remote control or contact the dealer.

If the user starts the motorcycle before pressing the $B_1$ button of the remote control, this last action may generate:

- either a continuous BIP (beep) telling him/her that an alarm will be emitted within ten to fifteen seconds. Button $B_1$ of the remote control should then be pressed in order to disable the alarm,
- or a regular BIP (beep) every second signaling that the alarm system is disabled. In this case, the user in his/her interest should call the surveillance center to enable the system (see enabling procedure).

If the motorcycle is moved while it is stationary, without pressing button $B_1$ of the remote control, the motorcycle is quietly put into the pre-alarm state. If it continues to be moved, an alarm is triggered and sent to the surveillance center without any warning within ten to fifteen seconds.

In order to handle the motorcycle, with the engine stopped, button $B_1$ of the remote control will therefore have to be used. Actuation of this button gives a renewable three minute handling time. Whenever this time has elapsed, a double beep is emitted.

If an alarm is triggered, the user will be informed by the surveillance center. If this is a false alarm, he will have to press on button $B_1$ of the remote control in order to acknowledge the relevant alarm.

This acknowledgement is absolutely necessary for resetting the alarm system into its normal surveillance state and for disabling the GPS and GSM modules.

In the case of extended loss of verticality (accident alarm), when the engine is running, the sideward tilt of the motorcycle beyond 60° degrees for a certain time triggers an accident alarm, the surveillance center attempts to contact the user before informing the emergency services. If this is a false alarm, he/she will have to press button $B_1$ of the remote control or set the motorcycle upright in order to acknowledge the relevant alarm.

This acknowledgement is absolutely necessary in order to reset the alarm system in its normal monitory state and for disabling the GPS and GSM modules.

To carry out the starting up of the alarm system, the user will have to call the surveillance center, provide his/her code and his/her password, ask for the alarm to be started up, actuate button $B_1$ of the remote control and wait for start-up confirmation from the center.

The user will check at every instant that the start-up has been accomplished by pressing button $B_1$ of the remote control. If this is accomplished, he/she will hear the sound signal BIP-BIP-BIP (beep-beep-beep).

To shut down the alarm system, the user will have to call the surveillance center, provide his/her code and his/her password, ask for the alarm to be shut down, actuate button $B_1$ of the remote control and wait for shut-down confirmation from the center.

At every moment, it is possible to check that shut-down has been accomplished by pressing button $B_1$ of the remote control. If this is accomplished, a long BIP (beep) is emitted.

An "emergency call" alarm may instantly be triggered by pressing for one second, button $B_2$ of the remote control. Transmission of the alarm is conditioned by the GSM coverage.

This function is available regardless of the state of the alarm system even if it is shut down.

The invention claimed is:

1. A method for ensuring the security of a two-wheeled vehicle, said method comprising the following steps:
   detecting a plurality of parameters of the vehicle including engine running/stopped, tilt, parked/moving, presence of the driver on the vehicle, and geographical localization,
   determining according to a logic for processing the detected parameters, and the state of at least one enabling/disabling command of a system, a system state taken from the following system states:
   a theft surveillance state, when the engine is stopped,
   an accident surveillance state, when the engine is running,
   a pre-alarm state caused by detecting a movement, a vibration, a shock or a power supply cut, while the vehicle was in the theft surveillance state, or subsequently to the starting of the vehicle,
   a disabled surveillance state (surveillance off) subsequently to a command for disabling the system,
   detecting, depending on the state of the system and on the detected parameters, one of the following system states:
   the theft alarm state, when subsequently to the pre-alarm state, the system has detected a sensitive parameter which is repeated and/or maintained during a predetermined period of time,
   the accident alarm state when subsequently to the accident surveillance state, the system detects an extended loss of verticality,
   when passing to one of the "alarm" states, elaborating a message comprising data for identifying the vehicle, its position, and data corresponding to the state of the system as well as telephonically transmitting this message to a remotely located caller or to a surveillance center.

2. The method according to claim 1, which comprises a succession of connection attempts until transmission is connected when a transmission of said messages to the caller is not effected when passing to an alarm state.

3. The method according to claim 1, which comprises the analysis of the following parameters:
   movements or vibrations detected in a pre-alarm mode a predetermined time,
   a tilt detected in the pre-alarm mode for a time "Tip", a displacement of the motorcycle detected by the central localization facility in the pre-alarm mode over a predetermined distance, and/or a combination of parameters including an external power cut, associated with brief detection of motion, and/or a succession of parameters including a loss of verticality, with the engine running, associated with the detection of a sudden drop in speed by the central localization facility, this combination of successive parameters indicating the presence of an accident.

4. The method according to claim 1, wherein only the surveillance center is authorized to enable or disable the system.

5. The method according to claim 4, which comprises a shut-down mode wherein the detection functions are inhibited and an alarm is neither detected nor sent back, this shut-down mode comprising the following steps:

having the owner of the vehicle, the motorcycle, call a surveillance center in order to request shutting down of the system, having the owner identified by the surveillance center which asks the owner to transmit to it his/her identifier and/or his/her password, having the owner order a disabling function to be executed by the surveillance center, when disabling is carried out by the surveillance center, emitting a sound signal, sign of the shutting down.

6. The method according to claim 4, which comprises a start-up mode comprising the following steps:

having the owner of the vehicle call the surveillance center in order to request starting up of the system, having the owner of the vehicle identified by the surveillance center by means of an identifier and/or a password, having the owner order an enabling function to be executed by the surveillance center, emitting a sound signal, sign of the enabling.

7. The method according to claim 1, which comprises a transient state for stopping the surveillance (SURVEIL_OFF) which is established during a period to be counted from the beginning of surveillance, when the vehicle is stationary, and in that, at the outcome of said period, said transient state is followed by a (SURVEIL_VOL) state.

8. The method according to claim 1, which carries out control actions subsequent to receiving control signals transmitted by the surveillance center.

9. The method according to claim 1, which comprises said parameters to provide the following functions:

in-operation detection of extended loss of verticality which is a potential sign of accident, start-up or shut-down of the system by a surveillance center, depending on information contained in the messages transmitted by the communications unit, in order to facilitate technical interventions including, storage at regular intervals of the position of the vehicle in order to transmit the position data to the surveillance center, remote control of various outputs including horn, blinker, power supply, management of a level of a vehicle battery in order to send an alert message when the level becomes low.

10. The method according to claim 1, wherein the detection of said "alarm" states is based on several types of detection including displacement/tilt, power supply cut, associated with localization by a central localization facility and with a concordance analysis.

11. A device for providing security of two-wheeled vehicles, which comprises a processor for executing the method of claim 1, the processor coupled with a central geographical localization facility and with a communications, with a cellular telephone network able to communicate with a caller, said processor being further connected to a plurality of detectors comprising at least one detector for detecting the running/stopped state of the engine of the vehicle, a detector for detecting the displacement of the vehicle and a tilt detector and with means for identifying the vehicle and/or its driver, and in that the processor is programmed in order to centralize the data from the detectors, to store the data and then to select by means of a logic for processing said data, a state of the device among a plurality of predetermined states incorporating one or more sensitive states revealing a theft or an accident and, when it has selected a sensitive state, to compose a message comprising data relative to this state as well as data for identifying the vehicle and/or its driver, and a geographical localization data, and to cause this message to be transmitted to the caller via the communications unit and the cellular telephone network.

12. The device according to claim 11, which further comprises means for detecting the normal running of the vehicle and/or means for reconstructing the route of the vehicle from inertial data provided by an accelerometric detector and/or from localization data.

13. The device according to claim 11, which comprises control means acting from control signals transmitted by the communications unit.

14. The device according to claim 11, which comprises a memory containing vehicle identification data and/or a device for remotely reading a transponder worn by the driver of the vehicle and in which an identifier of said driver is stored in memory.

15. The device according to claim 11, which comprises said processor is further connected to a voice synthesis circuit comprising a memory unit containing digital data corresponding to phonemes and a voice encoder used for generating audio messages transmissible through the communications unit.

16. The device according to claim 11, which further comprises a receiver, tuned on a transmitter mounted in a remote control case to equip the owner of the vehicle, the remote control case comprising means for controlling the disabling of the surveillance function and control means for triggering an immediate "emergency call" alarm regardless of the state of the vehicle or of the device.

* * * * *